April 10, 1934.　　　　　C. HANSEN　　　　　1,954,733
SEAM WIPER FOR CAN BODY MACHINES
Filed June 2, 1932　　　3 Sheets-Sheet 1
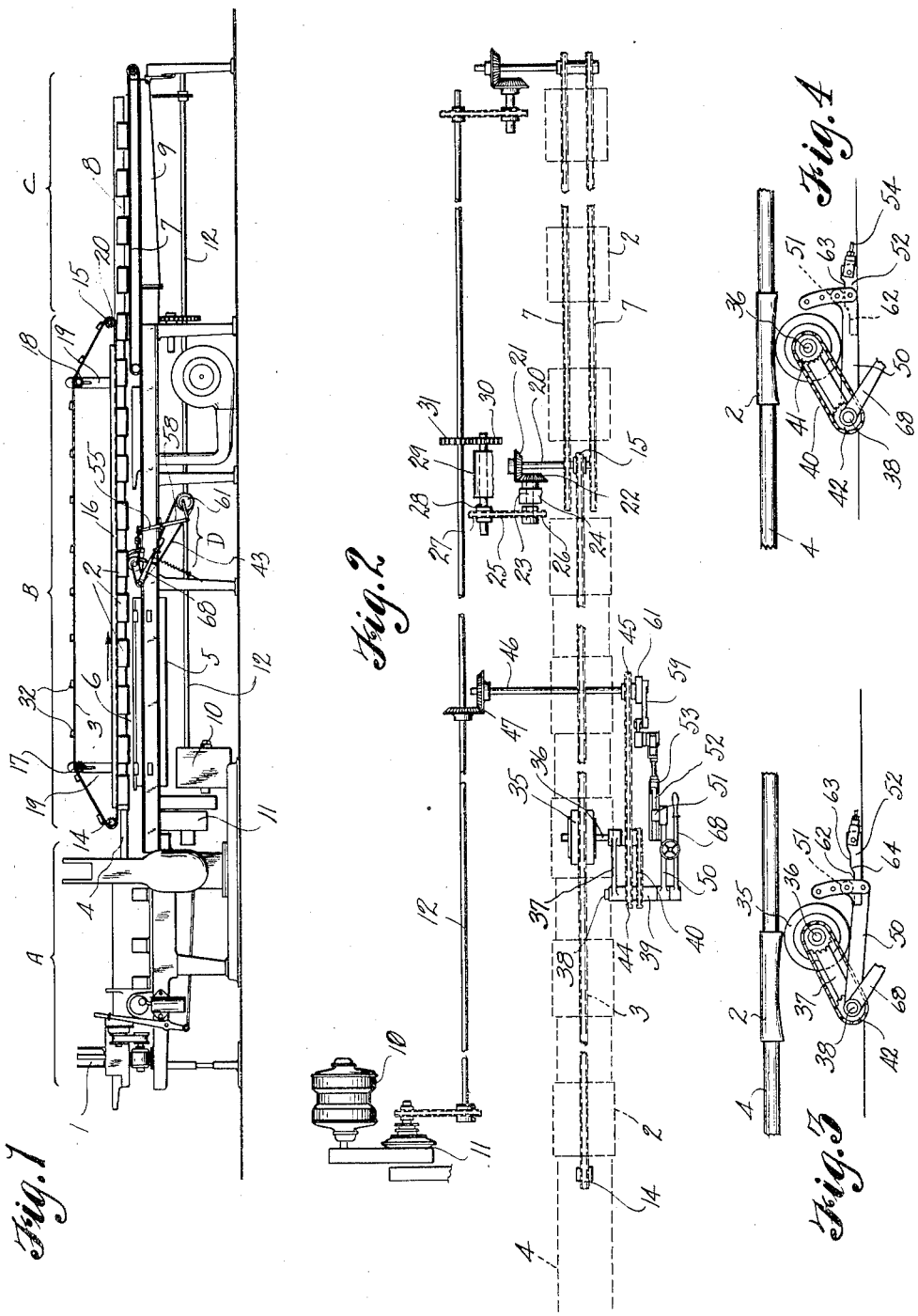
INVENTOR
CHRIS HANSEN
BY
Cook & Robinson
ATTORNEY

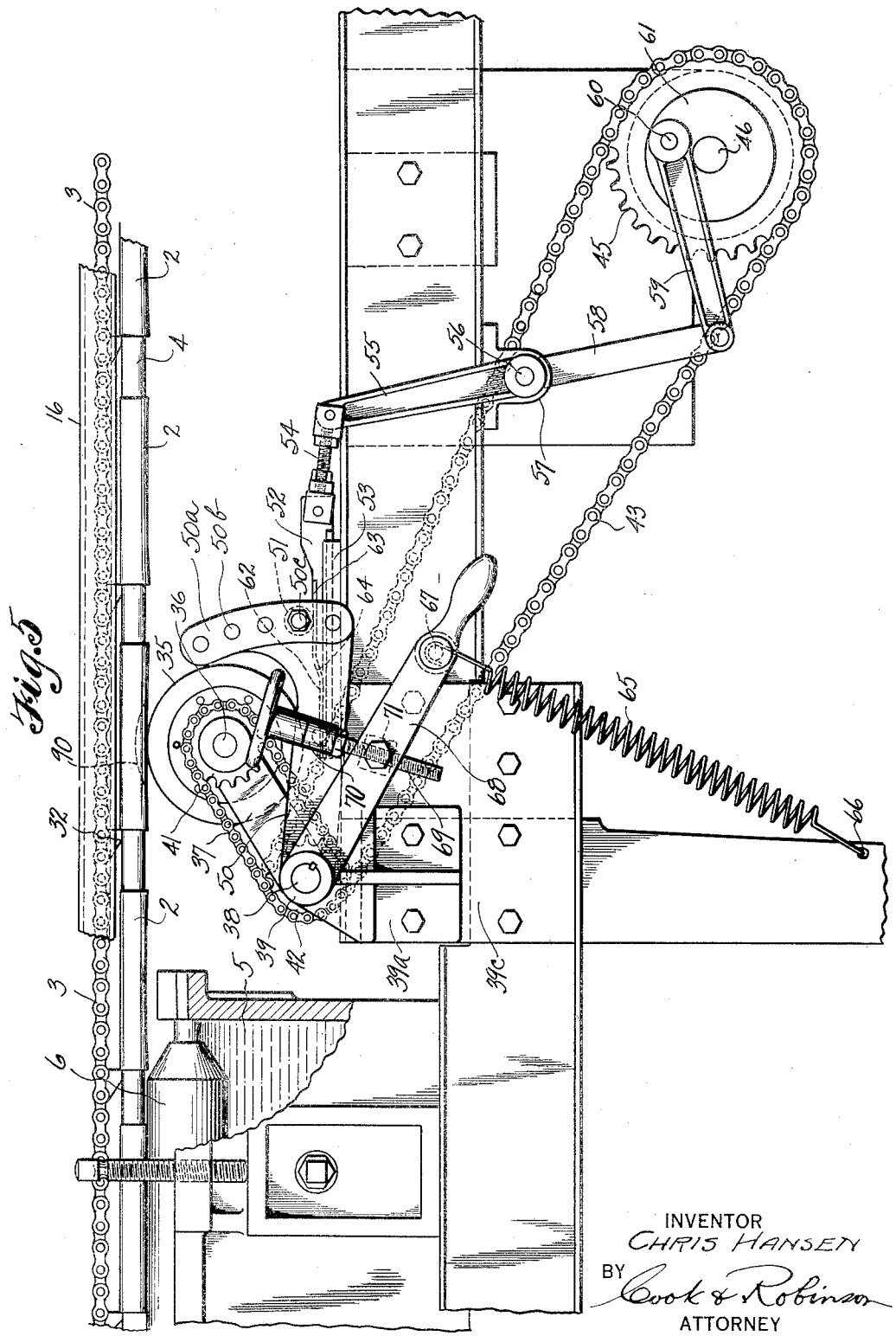

April 10, 1934.  C. HANSEN  1,954,733
SEAM WIPER FOR CAN BODY MACHINES
Filed June 2, 1932  3 Sheets-Sheet 3
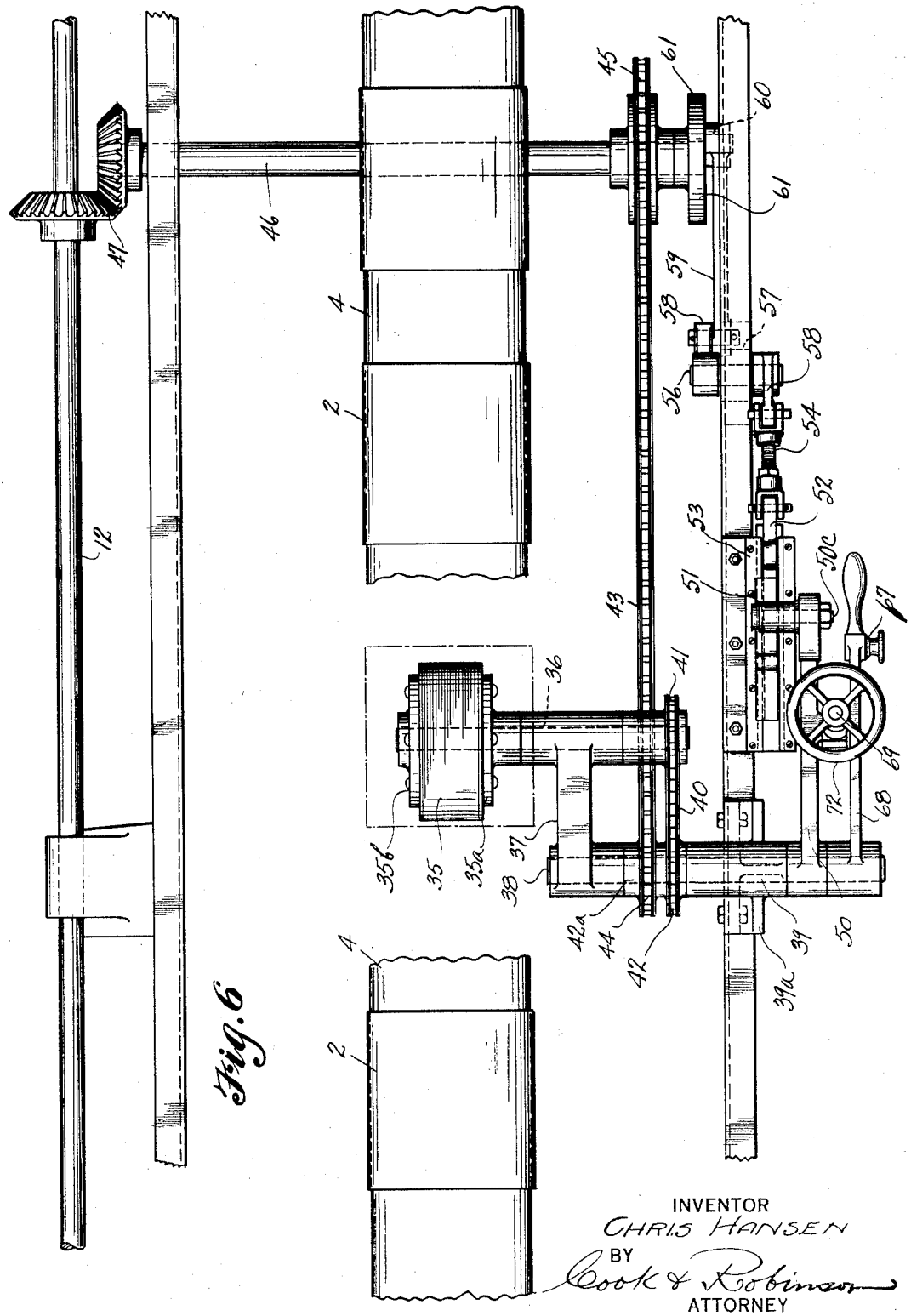
INVENTOR
CHRIS HANSEN
BY
Cook & Robinson
ATTORNEY

UNITED STATES PATENT OFFICE 1,954,733

SEAM WIPER FOR CAN BODY MACHINES

Chris Hansen, Seattle, Wash., assignor to Continental Can Company, Inc., New York, N. Y., a corporation Application June 2, 1932, Serial No. 615,013

4 Claims. (Cl. 113—97)

This invention relates to improvements in can body machines, or what are commonly referred to as body makers, more particularly, the invention relates to a seam wiping means for use in machines of the above stated character whereby excess solder will be wiped from the side seam of each can body immediately after the can has passed over the solder applying roll.

Explanatory to the present invention it will be stated that in the usual mechanical manufacture of can bodies, the ends of the body blanks are first notched and flanged to provide the end hooks. Then the blanks are formed about a body shaping horn, the ends hooked together and bumped to join them in a permanent seam. The bodies are then passed along a horn and the seams soldered.

Most cans have side seams of the lock and lap type, that is, at the ends of the seam the ends of the body blank overlap each other and between these overlapped portions, the hooks are interconnected in a locked seam. After the lock and lap seam is formed in the body blank, it is then soldered by passing the body over a solder applying roll that revolves in a pot of molten solder with its top edge exposed so that, by passing the can body lengthwise therealong, with the body seam adjacent the roll, solder will be applied thereto.

It is desirable, in order not to detract from the appearance of the finished can, and for other obvious reasons, that all excess solder be wiped from the body immediately after it passes the solder applying roll. Heretofore, this has been accomplished by a wiping roll mounted on a stationary support and revolubly driven to contact with the soldered seam as the can is delivered along the solder horn; the wiping roll being in the nature of a buffer or brush revolving against the can in a direction opposite to its direction of movement, and so adjusted relative to the horn, that it will wipe the seam with pressure sufficient to remove all solder in excess of that required for the seam.

It is desirable that this wiping roll brush or wipe the seam with uniform pressure throughout its entire length, but when the wiping roll has a stationary mounting, as has heretofore been the case, uniform pressure in wiping has not been obtained because of lengthwise warping or bowing up of the seam due to unequal expansion of the body material incident to applying the hot solder thereto. When the can body is bowed by this warping, should the wiping roll be set up so as to properly engage the seam along its medial portion, then it will be too close for the end portions and, as a consequence, the solder will be wiped from the laps, or else forced from the laps to the inside of the can and will be picked up on the inner surface. This warping of can bodies is much more pronounced in flat formed bodies than in cylindrical bodies.

There is also the undesirable result, should the wiping roll be set up too close to the horn along which the cans pass, of solder being deposited from the wiper on the horn, and this deposited solder subsequently picked up on the insides of the cans passing along the horn.

In view of the above, it has been the principal object of this invention to provide a wiping means whereby a soldered seam will be wiped with a uniform, or with a regulated pressure, so that no solder will be wiped out of the seams or forced through the lap joints. Also, to provide the horn, at a point adjacent the wiper, with a recess to avoid depositing of solder by the wiper on the horn.

More specifically stated, the present invention resides in the provision of a wiping roll as previously used but which has a movable support, actuated in synchronism with delivery of cans along the soldering horn, to cause the wiping roll to adjust itself toward and from the can in accordance with the curvature of the body seam so that substantially equal pressure will be applied along the length of the seam and the objectional wiping of solder from the end laps avoided.

In accomplishing these and other objects, I have provided the improved details of construction, the preferred forms of which are illustrated in the accompanying drawings, wherein—

Fig. 1 is a side elevation of a can body machine including a seam wiping roll applied thereto in accordance with the objects of the present invention.

Fig. 2 is a view illustrating, diagrammatically, in plan view the body conveyers and driving system of the machine and the location of the wiping device relative to the solder horn.

Fig. 3 is a side elevation of the wiping roll and its actuating mechanism showing, in an exaggerated manner, the bowed condition of the can after soldering and the lowered position of the wiping roll for proper wiping contact with the end laps of the seam.

Fig. 4 is a similar view, with the wiping roll in raised position for contact with the medial portion of the seam.

Fig. 5 is a side elevation of the wiping roll and its operating mechanism.

Fig. 6 is a plan view of the same.

Referring more in detail to the drawings—

Fig. 1 shows, in side elevation, a can body machine of a type with which the present seam wiping means is employed.

Briefly described, the machine comprises a body maker proper, designated in its entirety by reference character A, a side seamer B and cooler C. The body maker is provided at one end with a hopper 1, in which the body blanks are stacked. Feed devices, not illustrated, operate in the machine to deliver the blanks, successively, and in regular timing into the machine to devices whereby they are notched, flanged, shaped to body form and the ends finally joined in the lock and lap seam. The feed devices then deliver the can bodies, 2, into the side seamer B where they are then taken up by a conveyer chain belt 3 and advanced in regular spacing along a horn 4 across a solder pot 5 in which a solder roll 6 operates in the usual manner to apply solder to the side seams as the cans pass along the horn; it being understood that the seams are disposed in position for application of solder thereto by contact with the roll.

As the can bodies are delivered from the horn 4, by the conveyer chain belt 3, after being soldered they are taken up by conveyer chain belts 7—7 and delivered thereby along a guideway 8 over a cooler tube 9 from which air is discharged against the bodies to cool the soldered seams.

The various operating devices of the body maker A, the side seamer B, and cooler C in this instance have a common source of power which is shown as an electric motor 10. This motor, through suitable control and transmission mechanism, designated at 11, drives the body maker. It also drives a line shaft 12 that extends lengthwise of the machine and revolubly supported in suitable bearings attached to the supporting frames for the side seamer and cooler mechanism.

The conveyer chain belt 3 extends about sprocket wheels 14 and 15 at opposite ends of the horn 4, with the lower run of the belt operating in a supporting guide 16 parallel with and closely overlying the horn. The top run of the belt extends over sprocket wheels 17 and 18 on supporting brackets 19. The sprocket wheel 15 is mounted by a cross shaft 20, as seen in Fig. 2, and this shaft is driven by a geared connection with the line shaft 12; the connection as shown best in Fig. 2 consisting of a beveled gear 21 fixed on the end of shaft 20 in mesh with a beveled gear 22 fixed on a driven shaft 23 carried by a mounting bracket 24 secured to a supporting frame of the side seamer mechanism. The shaft 23 in turn is driven by a chain belt 25 which operates about a sprocket wheel 26 on shaft 23 and a sprocket wheel 27 on a counter shaft 28. The shaft 28 is parallel with shaft 12 and is mounted by a support 29 fixed to the machine frame and is driven through the medium of intermeshing gears 30 and 31 fixed to the shafts 28 and 12, respectively.

The conveyer chain belt 3 has attachment links, in the form of pushers 32 fixed thereto at regular intervals and these engage the can bodies as they are delivered from the forming horn of the body machine, and push them, in spaced relation, along the solder horn 4, across the solder roll and finally discharge them into the guideway 8 for delivery by the conveyers 7 along the cooler tube and from the machine.

The seam wiping mechanism, embodied by this invention, is located adjacent the delivery end of the solder roll and it is designated in its entirety in Fig. 1 by reference character D. The wiping roll 35 is located directly beneath the horn 4 and is fixed on a supporting arbor 36 revolubly mounted at one end of an arm 37; the arm 37 being fixed on a short rocker shaft 38 that extends in a direction crosswise of the horn and is revolubly mounted in a bearing 39 fixed by a bracket 39a to member 39c of the side seamer frame. The arbor 36 is driven by a chain belt 40 operating about a sprocket wheel 41 keyed thereonto and about a sprocket wheel 42 that is revoluble on the cross shaft 38; the sprocket wheel 42, in turn, being driven by a chain belt 43 operating about a sprocket wheel 44 fixed on the hub 42a of wheel 42 and a sprocket wheel 45 on a shaft 46 extends across the frame below the horn and is driven by a set of bevel gears, as at 47, from the shaft 12, as seen in Fig. 6. This driving connection is such that the wiping roll 35 will rotate against the cans opposite to their direction of travel. Preferably the wiping roll is made up of a plurality of flannel disks placed together on the shaft 36 and clamped between a pair of face plates 35a and 35b, one of which is fixed to shaft 36.

Mounted on the cross shaft 38 and extending in a substantially horizontal position along side of the side seamer frame, is a lever arm 50 at the end of which is a cam roller 51. This roller rides upon a slide 52 that is reciprocally mounted in a guide 53 fixed upon the beam. The slide is pivotally connected at its end by an adjustable link 54 with a lever arm 55 on a pivot shaft 56 rotatably mounted in a bearing 57 fixed to the side beam of the frame. Another lever arm 58 is fixed to the pivot shaft and this is pivotally connected at its end to a link 59 which is eccentrically attached by a pivot 60 to a crank disk 61 fixed on the driven shaft 46. The connection provides that incident to rotation of shaft 38, the slide 52 will be reciprocally actuated, and the rate of reciprocation is exactly equal to the rate of delivery of cans past the wiping roll by the conveyer chain 3; it being apparent that these parts may be synchronized in movement by proper connection with the drive shaft 12 which is a drive common to all moving parts. The cam slide 52 has two surfaces of different level, namely, a lower horizontal surface 62 and an upper horizontal surface 63. These are connected by a relatively short inclined surface 64 over which the cam roller 50 may pass from one surface to the other incident to reciprocal action of the slide. The cam roller is held against the cam slide during reciprocal action of the latter by a coiled spring 65 that is attached at one end as at 66 to the supporting frame structure of the machine and at its other end is attached by a bolt 67 to a lever arm 68 that is keyed on the outer end of shaft 38. The lever arm 50 is adjustably fixed relative to arm 68 by an adjusting bolt 69 which is revolubly fixed in a block 70 pivoted in arm 50 and is threaded through a block 71 pivoted in arm 68. A hand wheel 72 is fixed on the upper end of this bolt for turning it in making adjustment of arm 68 relative to arm 50.

The arm 50 is provided with a segmental end portion 50a provided with a series of holes 50b therealong for mounting the pivot bolt 50c of the cam roller 51 to change the position of the wiping roll to accommodate different sizes of cans, that is, if the size of the can is such that the wiping roll should be adjusted downwardly then the cam roller is moved to a higher position on the segment 50a.

Assuming the parts to be so constructed and assembled, it is apparent that in operation of the body maker, the can bodies 2 will be delivered by the conveyer chain 3 along the horn 4 across the solder roll 6 and then past the wiping roll 35. For each can passing the roll, the cam slide is moved inwardly, then outwardly. Thus, the cam roller will pass from the lower can surface onto the higher one, then back to the lower one, and this will cause the wiping roll to move from its lowered position, as in Fig. 3, to its raised position, as in Fig. 4, then back to initial position. It is apparent then, that by properly timing these movements, with the delivery of cans along the horn, the cans may be made to contact with the wiping roll at the ends of the seam when the roll is in lowered position and the medial portion of each seam wiped by the roll when it is in its raised position. Thus, by proper adjustment of the roll mounting arm 37, relative to arm 50, and by proper relationship of the cam surfaces, the wiping roll may be caused to wipe the seam with an even pressure throughout its length or with a pressure so regulated that no solder will be wiped from the laps at the ends of the seam.

To avoid depositing solder from the wiping roll 35 onto the horn 4, the horn, as seen in Fig. 5, is provided with a recess 90 in the under side thereof to prevent contact of the roll with the horn. Thus no solder, picked up by the roll 35, will be wiped onto the horn and subsequently picked up by the cans passing along the horn.

Having thus described my invention, what I claim as new therein and desire to secure by Letters-Patent is—

1. In a can making machine, the combination with a horn, a solder applying means, and a conveyer whereby can bodies are moved in regular order along the horn and across said solder applying means for application of solder to the side seams thereof, of a seam wiping roll, a support therefor, and a cam acting on said support in synchronism with travel of cans on the horn for moving said roll toward and from the can body while in contact therewith for maintaining a substantially uniform pressure of the roll against the seam throughout the entire length of the seam.

2. In a can making machine, the combination with a horn, a solder applying means and a conveyer whereby can bodies are moved in regular order along the horn and across the solder applying means, of a seam wiping roll, a support therefor, means for revolving the roll for wiping contact with the bodies, a cam slide reciprocally actuated in accordance with rate of delivery of cans across the roll and operable to raise and lower the roll while in contact with the seam for maintaining a substantially uniform pressure of the roll against the seam throughout the entire length of the seam.

3. In a can making machine, the combination with a horn, a solder applying means, a conveyer for moving cans in regular order along the horn across said solder applying means for application of solder to the side seams thereof and a conveyer driving means, of a roll disposed to wipe the can seams, a rock shaft, an arm supporting the roll from said shaft, a lever on the shaft, a cam slide acting on said lever, and means operable by the conveyer driving means to reciprocate the cam slide in accordance with delivery of cans across said roll to move the said roll toward and from each can as it passes thereover in accordance with curvature of the can body.

4. In a can making machine, the combination with a horn, a solder applying means, a conveyer for moving cans in regular spacing along the horn and across the solder applying means for application of solder to the side seams thereof and a conveyer driving means, of a seam wiping means comprising, a rock shaft, an arm fixed thereto, an arbor on the arm, a seam wiping roll on the arbor across which the cans are moved, means for revolving said roll, a rocker lever fixed relative to the rock shaft, a cam roller on said lever, a cam slide engaged by said roller having surfaces of different level, means connecting said slide with the conveyer driving means for reciprocating it in accordance with travel of cans across the roll and whereby the roll is actuated toward and from each can as it passes thereover to effect a light wiping pressure on the seam ends.

CHRIS HANSEN.